(12) United States Patent
Bethoule et al.

(10) Patent No.: US 10,084,294 B2
(45) Date of Patent: Sep. 25, 2018

(54) CABLE ROUTING ASSEMBLY

(71) Applicants: LEGRAND FRANCE, Limoges (FR); LEGRAND SNC, Limoges (FR)

(72) Inventors: Julien Bethoule, Le Mans (FR); Laurent Denis, Sarge les le Mans (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 441 days.

(21) Appl. No.: 14/336,098

(22) Filed: Jul. 21, 2014

(65) Prior Publication Data

US 2015/0021085 A1 Jan. 22, 2015

(30) Foreign Application Priority Data

Jul. 22, 2013 (FR) ..................... 13 57209

(51) Int. Cl.
*H02G 15/02* (2006.01)
*H02G 1/04* (2006.01)
*H02G 3/04* (2006.01)
*H02G 3/00* (2006.01)

(52) U.S. Cl.
CPC ............. *H02G 1/04* (2013.01); *H02G 3/0406* (2013.01); *H02G 3/0437* (2013.01); *H02G 3/0443* (2013.01); *H02G 3/263* (2013.01)

(58) Field of Classification Search
CPC .... H02G 15/113; H02G 3/0437; H02G 3/128; H02G 3/0608; H02G 15/043; H02G 1/04; H02G 3/0443; H02G 3/0406; H02G 3/263; H01R 11/11; H01R 4/023; H01R 4/22; B60R 16/0207; H01B 7/0045

USPC ......... 174/84 R, 135, 491, 74 R, 92; 248/63, 248/68.1, 73
See application file for complete search history.

(56) References Cited

U.S. PATENT DOCUMENTS

| 5,384,937 A * | 1/1995 | Simon | H02G 3/0443 |
| | | | 211/181.1 |
| 6,590,154 B1* | 7/2003 | Badey | H02G 3/0443 |
| | | | 174/135 |
| 7,954,776 B2* | 6/2011 | Davis | E04F 15/0247 |
| | | | 24/458 |

(Continued)

FOREIGN PATENT DOCUMENTS

| EP | 0 556 137 | 8/1993 |
| EP | 1 315 261 | 5/2003 |

(Continued)

OTHER PUBLICATIONS

Finco et al.: CA 2412195 A : published on May 23, 2003.*
French Search Report dated Apr. 14, 2014, corresponding to the Foreign Priority Application No. 1357209.

*Primary Examiner* — Pete Lee
(74) *Attorney, Agent, or Firm* — Young & Thompson

(57) ABSTRACT

The assembly includes an openworked cable raceway (11) having a base (15) and side walls (16), the assembly (10) being provided for installing along a ceiling, and including at least one curved elongated panel (12), the concave surface of which faces towards the cable raceway (11), which curved elongated panel (12) is fastened to the cable raceway (11) and envelops the outside of the cable raceway (11) in line with a single side wall (16) and in line with at least a portion of the base (15) starting from the side wall (16).

14 Claims, 16 Drawing Sheets

(56) References Cited

U.S. PATENT DOCUMENTS

| | | | | |
|---|---|---|---|---|
| 8,173,903 B2* | 5/2012 | Letourneur | ............ | H02G 3/0443 |
| | | | | 174/135 |
| 2006/0038091 A1* | 2/2006 | Winn | .................... | H02G 3/0443 |
| | | | | 248/49 |
| 2009/0145626 A1* | 6/2009 | Quertelet | ............. | H02G 3/0443 |
| | | | | 174/97 |
| 2011/0006022 A1* | 1/2011 | Caveney | .............. | H02G 3/0443 |
| | | | | 211/133.5 |

FOREIGN PATENT DOCUMENTS

| | | |
|---|---|---|
| EP | 2 453 540 | 5/2012 |
| FR | 2 652 142 | 3/1991 |
| FR | 2 716 768 | 9/1995 |
| FR | 2 727 186 | 5/1996 |
| FR | 2 879 036 | 6/2006 |

\* cited by examiner

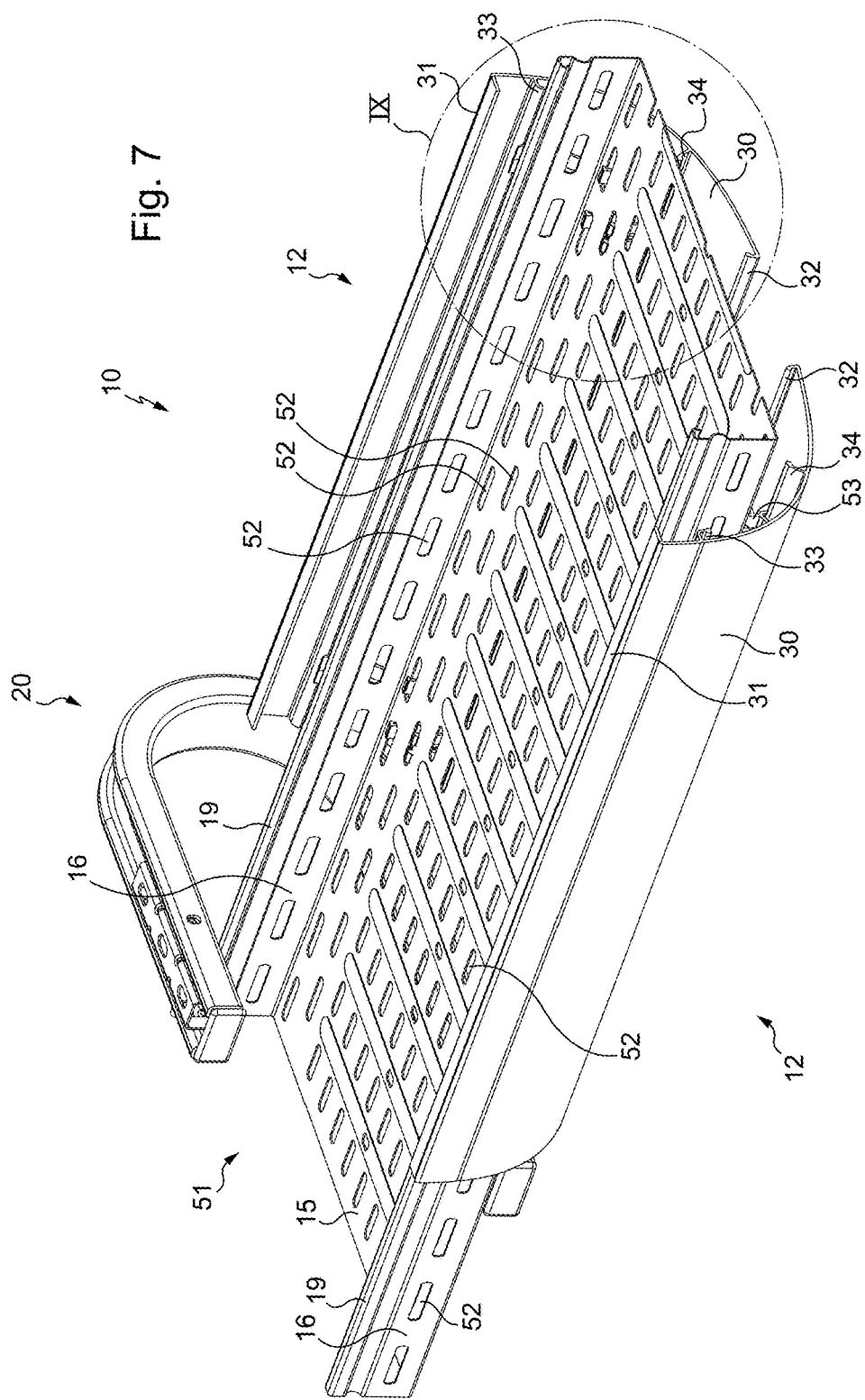

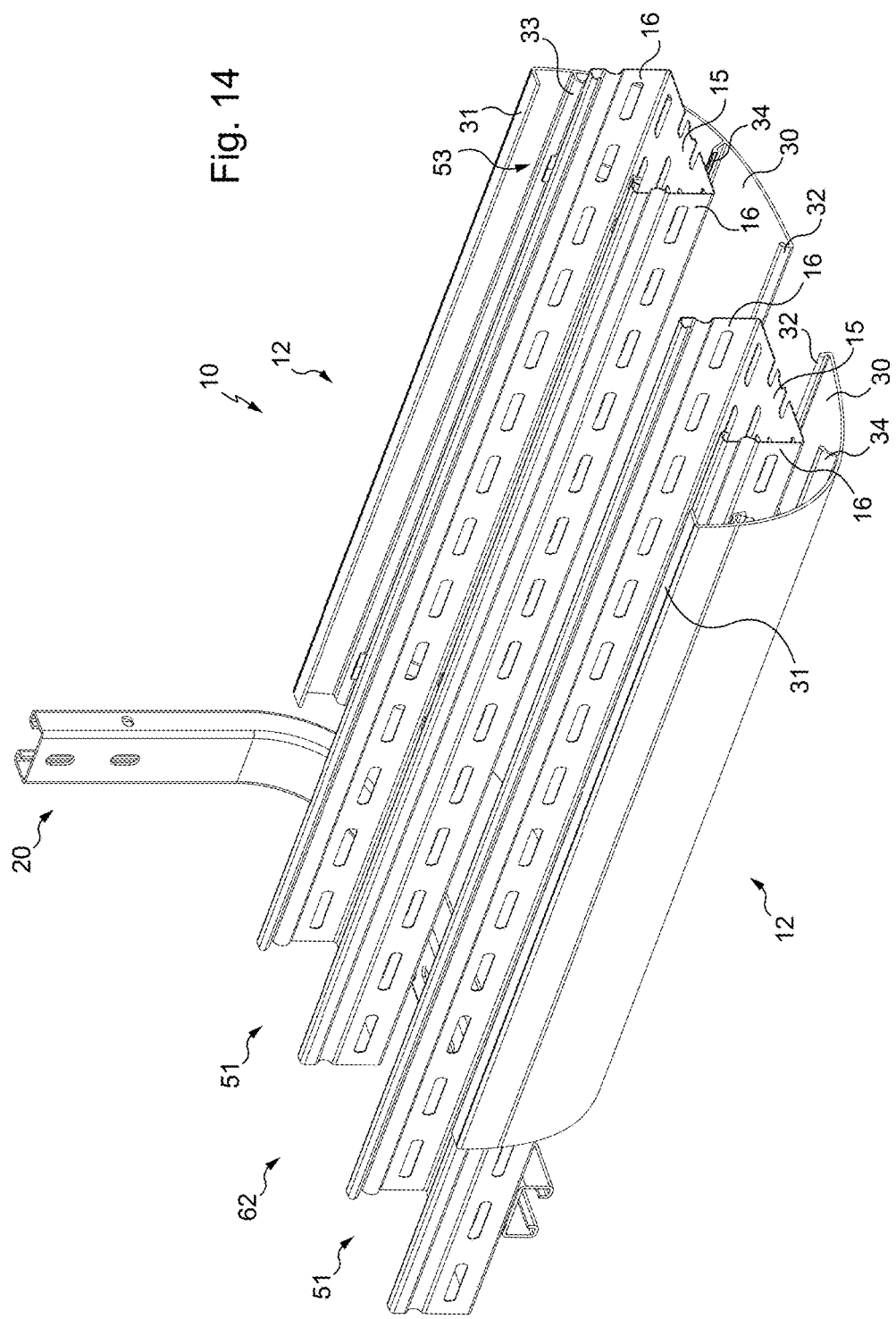

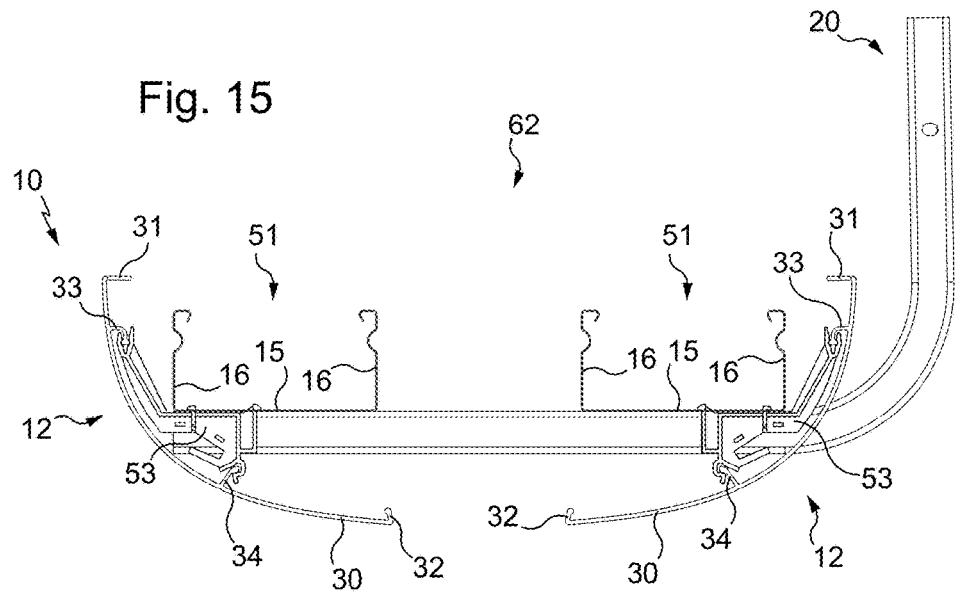
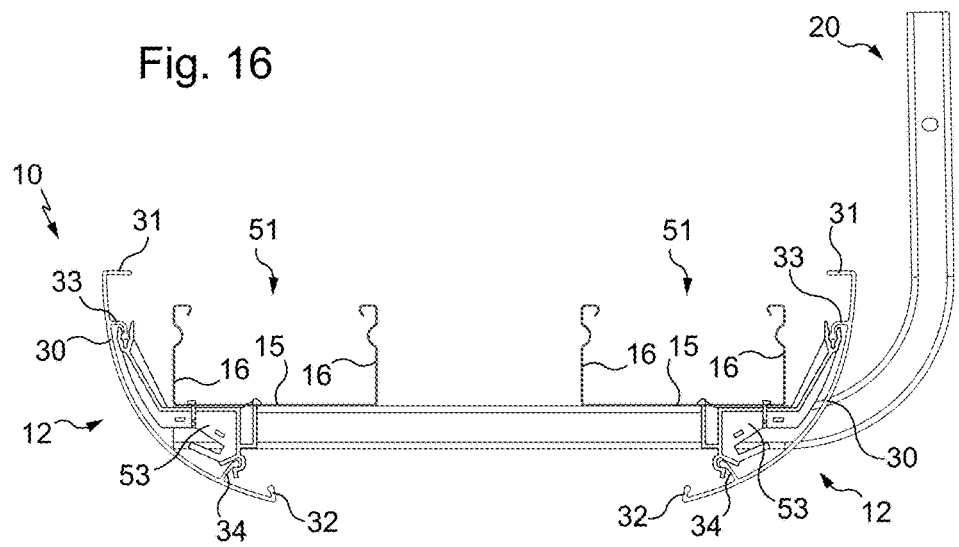

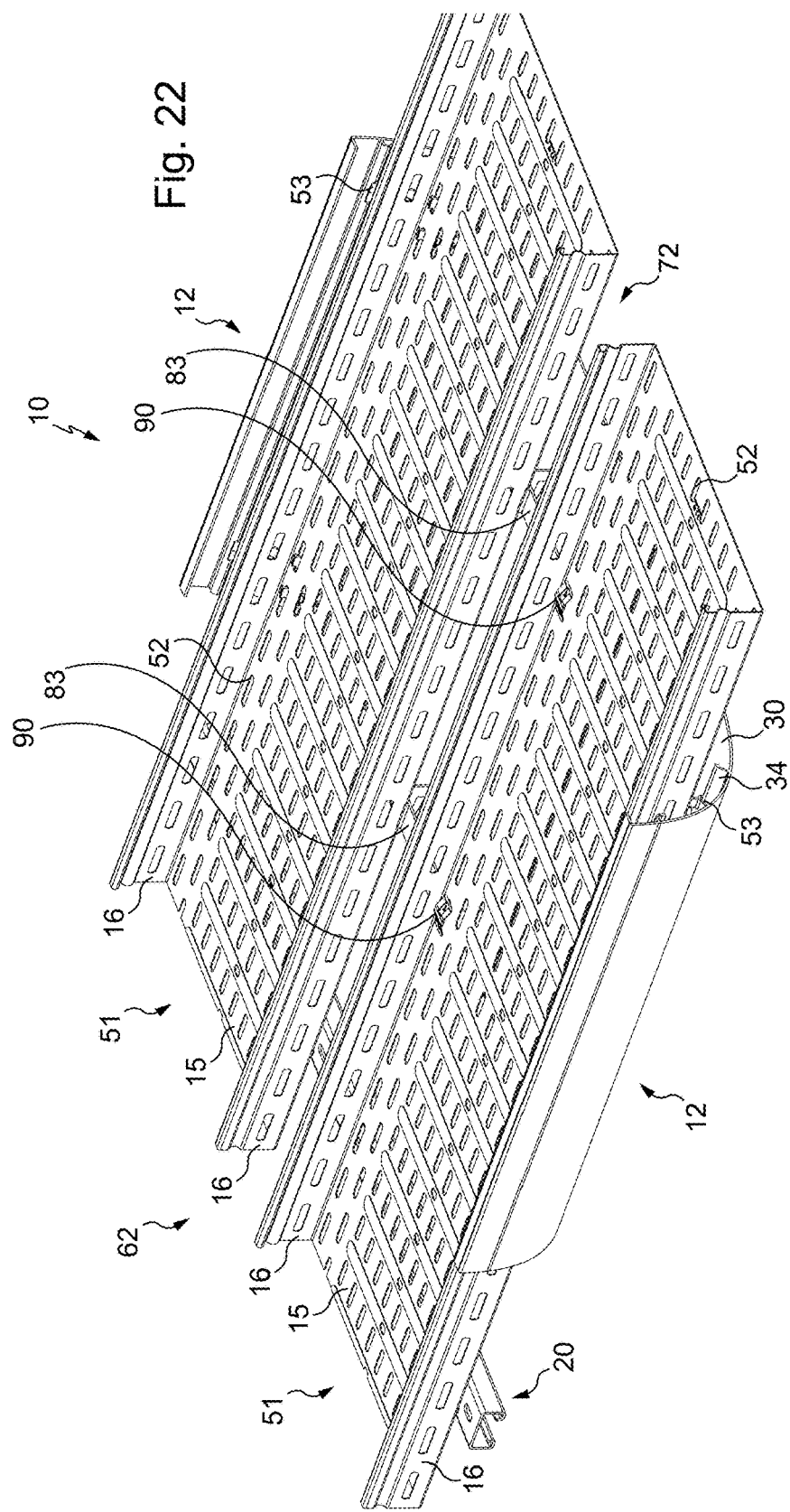

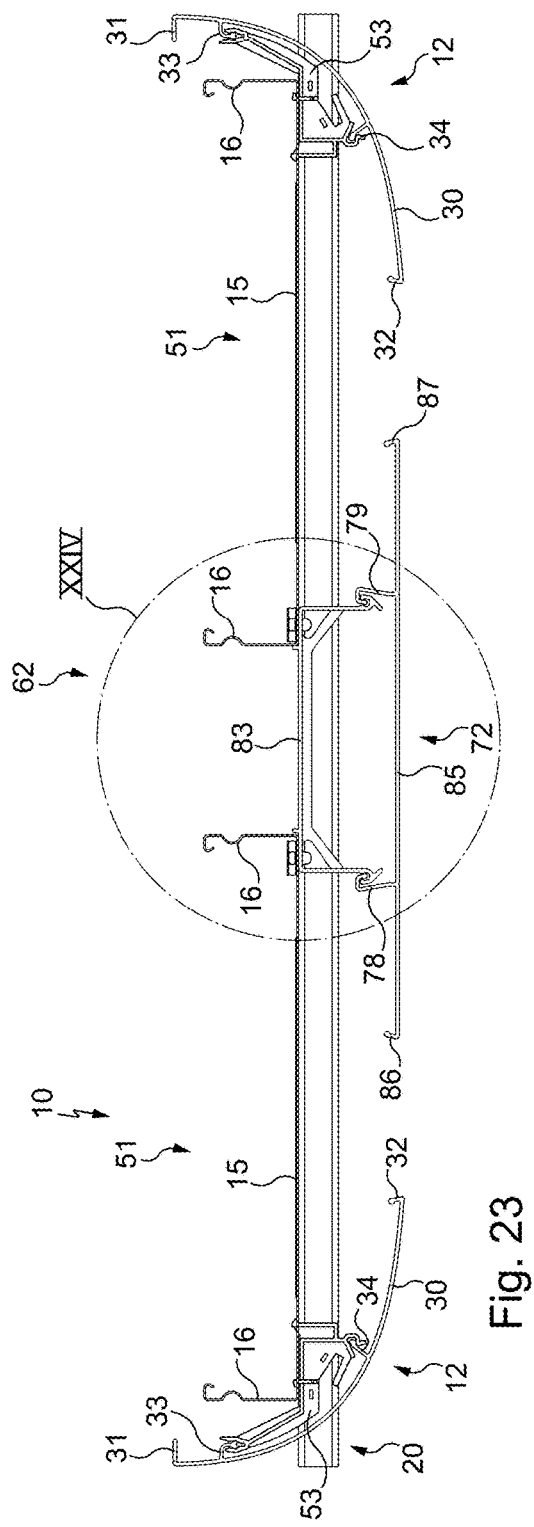

CABLE ROUTING ASSEMBLY

FIELD OF THE INVENTION

The invention relates to the routing of cables in openworked cable raceways having a base and side walls.

TECHNOLOGICAL BACKGROUND

It is known that such cable raceways are commonly used to route electrical cables or the like, for example air ducts, along the partitions of certain premises, particularly along a wall or ceiling.

Generally, openworked cable raceways are formed from metal wire mesh or from folded perforated sheet metal.

In practice, a cable raceway is formed by cable raceway sections arranged end-to-end and secured to each other by devices such as butt straps. It is understood that the expression "cable raceway" relates herein to the cable raceway sections and securing devices between the successive cable raceway sections.

SUBJECT OF THE INVENTION

The invention aims to improve the aesthetic qualities of such cable raceways in a simple, convenient and cost-effective manner.

To this end, the invention proposes a cable routing assembly, comprising an openworked cable raceway having a base and side walls, said assembly being provided for installing along a ceiling, characterised in that it also comprises at least one curved elongated panel, the concave surface of which faces towards the cable raceway, which curved elongated panel is fastened to said cable raceway and envelops the outside of said cable raceway in line with a single side wall and in line with at least a portion of the base starting from said side wall.

The curved elongated panel included in the routing assembly according to the invention partially covers the outside of the cable raceway.

The appearance of the routing assembly according to the invention, particularly if it is installed along a ceiling and is observed by an observer on the ground, is therefore provided partially by the curved elongated panel, which is a simple part that can easily be given good aesthetic qualities.

The cable routing assembly according to the invention can therefore remain visible, including in an office building, rather than being hidden by a false ceiling.

The fact that the cable raceway is only partially concealed by the curved elongated panel leaves the unconcealed portion of the cable raceway available, for example to act as a support for fastening electrical appliances such as light fittings or smoke detectors.

The cable routing assembly according to the invention therefore offers good aesthetic qualities while retaining one of the benefits of a bare cable raceway.

The cable routing assembly according to the invention also retains another of the benefits of a bare cable raceway, namely the satisfactory ventilation of the cables or the like arranged in the cable raceway.

The curved elongated panel included in the routing assembly according to the invention to cover the cable raceway, alone or with another elongated panel, is easy to produce as it is a part that has a reasonable width, the configuration of which involves a single lateral side of the cable raceway (and not both sides).

This one-sided nature of the curved elongated panel of the routing assembly according to the invention offers great flexibility of arrangement, for example, as disclosed below, covering a single cable raceway on both sides with two curved elongated panels, or covering two cable raceways arranged side-by-side with two curved elongated panels arranged on either side of the cable routing device formed by said two cable raceways.

According to advantageous features of embodiments of the cable routing assembly according to the invention:

said curved elongated panel comprises a main wall and longitudinally-oriented ribs, protruding from said main wall on the concave side of said curved elongated panel; and said assembly comprises fasteners for fastening said cable raceway and said curved elongated panel to one another, each said fastener comprising elements for fastening onto said ribs;

said cable raceway is made from metal wire mesh and said fastener comprises at least one system of catches for engaging on wires of said cable raceway;

said cable raceway is made from perforated sheet metal and said fastener comprises detents for holding onto the periphery of openings of the cable raceway; and/or said curved elongated panel is completely curved between its upper longitudinal side and its lower longitudinal side.

In an advantageous embodiment, in the cable routing assembly according to the invention, the cover is two-sided, and more specifically the assembly comprises a routing device formed by said cable raceway or formed by said cable raceway and at least one other cable raceway with the cable raceways of the device arranged side-by-side, each cable raceway included in said device being openworked and having a base and side walls; and said assembly comprises a cover formed by at least said curved elongated panel and another curved elongated panel, said cover enveloping the outside of said device on each lateral side and partially on the bottom side starting from each lateral side.

According to advantageous features of said embodiment:

said routing device is formed by said cable raceway and at least one other cable raceway; and said cover is formed by said curved elongated panel, said other curved elongated panel and at least one straight elongated panel enveloping said device on the bottom side at least in line with an area spanning said two cable raceways;

said cover envelops the outside of the bottom side of said device apart from in line with the middle portion of the base of each said cable raceway;

said straight elongated panel comprises a main wall and longitudinally-oriented ribs, protruding from said main wall, and said assembly comprises fasteners for fastening said cable raceways of said routing device to said straight elongated panel, each said fastener comprising elements for fastening onto said ribs; and/or said routing device is formed by said cable raceway and at least one other cable raceway; and said assembly comprises a mounting component for at least one electrical appliance between said cable raceway and said other cable raceway, which mounting component is configured to engage on said cable raceway and said other cable raceway.

BRIEF DESCRIPTION OF THE DRAWINGS

The disclosure of the invention will now continue with a detailed description of embodiments, given below as a non-limitative illustration, with reference to the attached drawings, in which:

FIGS. 7 to 10 are similar views to FIGS. 1 to 4, but for a cable raceway made from perforated sheet metal rather than wire mesh;

FIGS. 14 to 16 are similar views to FIGS. 11 to 13, but for cable raceways made from perforated sheet metal rather than wire mesh;

FIGS. 22 to 24 are similar views to FIGS. 18, 19 and 21, but for cable raceways made from perforated sheet metal rather than wire mesh.

DETAILED DESCRIPTION OF EMBODIMENTS

Figure 1:
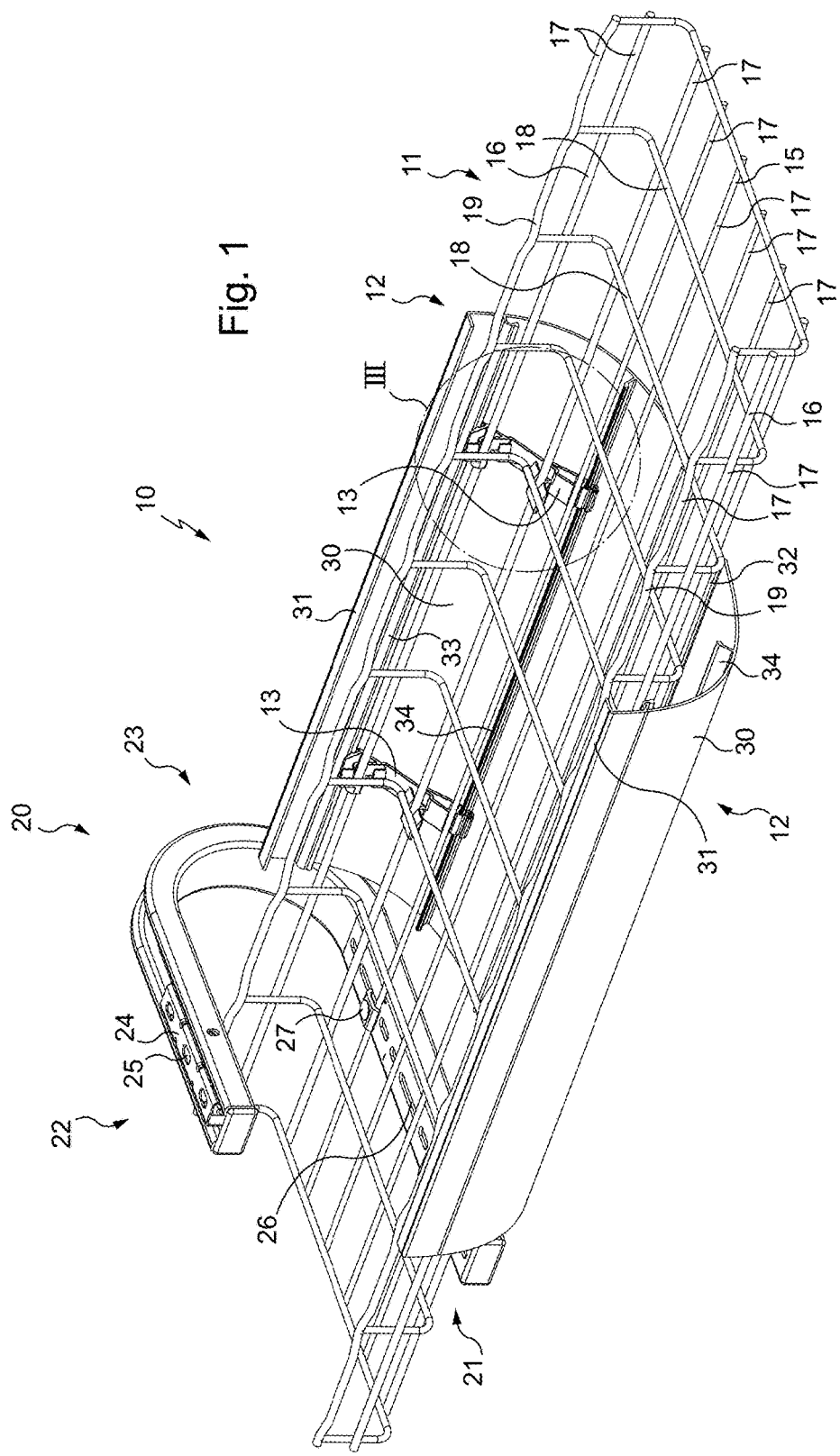
FIG. 1 is a perspective view of a cable routing assembly according to the invention and a bracket for providing a horizontal support for the cable raceway included in said routing assembly.

The cable routing assembly 10 shown in FIGS. 1 to 4 comprises a cable raceway 11, two curved elongated panels 12 and fasteners 13 used to fasten the cable raceways 11 and the curved elongated panels 12 to one another.

The cable raceway 11 is a conventional U-shaped cable raceway the walls of which, in this case a base 15 and two side walls 16, are openworked.

Here, the cable raceway 11 is of the type made from metal wire mesh, namely warp wires 17 extending longitudinally and weft wires 18 extending transversely, U-shaped, with a weld at each intersection between a warp wire 17 and a weft wire 18.

The warp wires 17 that extend at the level of the ends of the weft wires 18 each form an edge 19 of the cable raceway 11.

Here, the cable raceway 11 is intended to run along a ceiling or another structure having a surface overhanging the space where the cable raceway 11 is to be located.

Along the ceiling or other structure, the base 15 is intended to be oriented horizontally, including when the ceiling or other structure is sloped.

Here, the cable raceway 11 is fastened to the structure such as a ceiling by brackets 20, only one of which is shown.

Each bracket 20 comprises a portion 21 configured to form a horizontal support for the cable raceway 11, a portion 22 configured to be fastened to the structure such as a ceiling and an elbow 23 located between the portion 21 and the portion 22.

The portion 22 is fastened to the structure such as a ceiling by means of a fastening accessory 24 having openings 25 through which the shank of a screw or another fastening element can pass.

The base 15 of the cable raceway 11 rests on the portion 21 of the bracket 20.

Figure 2:
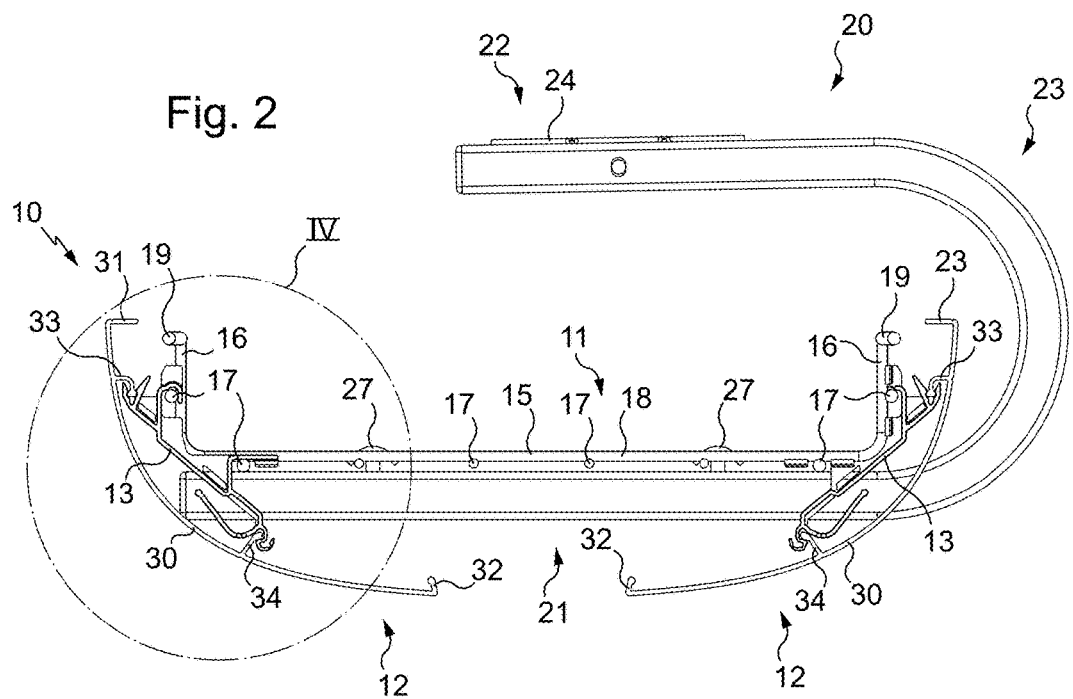
FIG. 2 is a front elevation of said routing assembly and said bracket.

To make it possible to fasten the cable raceway 11 to the bracket 20, the portion 21 has openings 26 through which the shank of a screw or another fastening element such as the fastening element 27 shown in FIGS. 1 and 2 can pass.

It will be noted that the applicants have filed a French patent application for the bracket 20.

Each curved elongated panel 12 extends between two brackets 20 or similar support members.

The curved elongated panels 12 are identical and arranged head-to-tail. The arrangement of one of the curved elongated panels 12 is thus a mirror image of the other curved elongated panel 12.

Each curved elongated panel 12 is a profile member, obtained here by extrusion of a relatively rigid material, for example a plastic.

Each curved elongated panel 12 has a main wall 30 that has a curved profile and is elongated in the longitudinal direction.

Here, the longitudinal sides of the main wall 30 are parallel.

On the concave side of the main wall 30, i.e. on the side intended to face the cable raceway 11, the curved elongated panel 12 comprises:

a return 31 and a return 32, each connected by a longitudinal side to a respective longitudinal side of the main wall 30; and a rib 33 and a rib 34 each extending longitudinally, with the rib 33 being located between the return 31 and the rib 34, and the rib 34 being located between the rib 33 and the return 32.

Each fastener 13 is configured to engage on the one hand on wires of the cable raceway 11 and on the other hand on the ribs 33 and 34 of the curved elongated panel 12.

Using intermediate fasteners 13 between the curved elongated panel 12 and the cable raceway 11, rather than fastening the curved elongated panel 12 directly onto the cable raceway 11, offers the advantage of making it possible for the curved elongated panel 12 to have simple shapes, particularly the ribs 33 and 34, that can be obtained simply and cost-effectively, here by extrusion.

The complex shapes making it possible to fasten the curved elongated panel 12 to the cable raceway 11 appear on the fasteners 13, which are made from a material that is rigid but has a certain degree of elasticity, here a moulded plastic.

Figure 3:
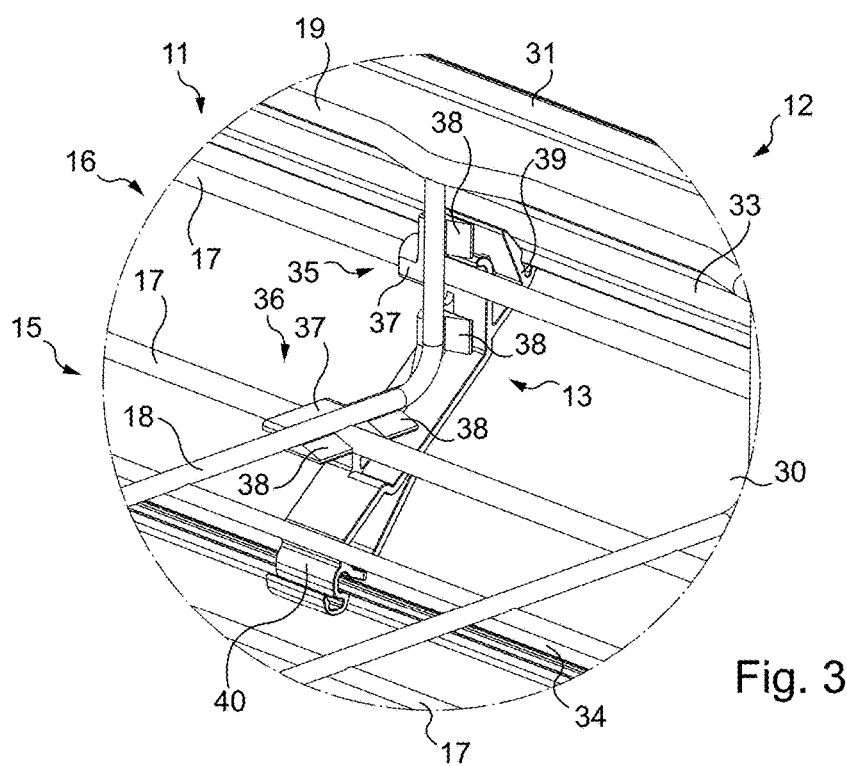
FIGS. 3 and 4 are detailed views marked respectively as III in FIG. 1 and IV in FIG. 2.
Figure 4:
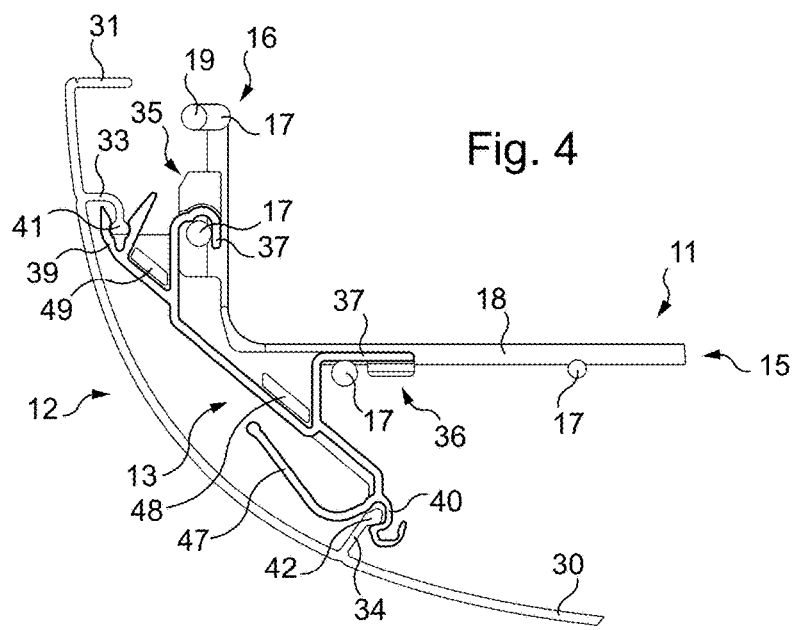

The fastener 13 will now be described in more detail, with reference to FIGS. 3 and 4.

The fastener 13 comprises a catch system 35 for engaging on an intersection between a warp wire 17 and a weft wire 18 of a side wall 16, and a catch system 36 for engaging on an intersection between a warp wire 17 and a weft wire 18 of the base 15.

More specifically, the catch system 35 and the catch system 36 are intended to engage on the same weft wire 18 and on two adjacent warp wires 17 respectively forming part of a side wall 16 and the base 15.

On the side wall 16 (catch system 35), this is the warp wire 17 closest to the base 15 and on the base 15 (catch system 36), this is the warp wire 17 closest to said side wall 16.

Each of the catch systems 35 and 36 comprises a bearing member 37 on the warp wire 17 and two retaining detents 38 on the weft wire 18.

The retaining detents 38 are arranged on either side of the bearing member 37 to engage on the weft wire 18 on either side of the warp wire 17.

Here, the retaining detents 38 are configured to be arranged on the outside of the weft wire 18, while the bearing members 37 are configured to be arranged on the inside of the warp wires 17; when in the cable raceway 11, the weft wires 18 are arranged on the inside.

This arrangement offers the advantage, for the catch system 35 and the catch system 36, of not producing any protrusion inside the cable raceway 11, as the retaining detents 38 are on the outside and the bearing members 37 are on the inside of the warp wire 17 and occupy a space that does not extend beyond the weft wire 18.

For the catch system 35, the bearing member 37 is formed by an end portion of a hook.

For the catch system 36, the bearing member 37 is formed by a small bridge extending between the two retaining detents 38.

This configuration of the bearing members 37 makes it possible to position the fastener 13 by moving it in a transverse direction from the outside to the inside, to put it in a position in which it is higher than in its locked position shown in the drawings and away from the weft wire 18. When the bearing member 37 of the catch system 35 is beyond the warp wire 17, the fastener 13 can be lowered until the hooked portion to which the bearing member 37 of the catch system 35 belongs and the bearing member 37 of the catch system 36 are each resting on a warp wire 17. The fastener 13 can then be slid along the warp wires 17 until the retaining detents 38 engage on the weft wire 18.

In addition to the systems 35 and 36 of catches for engaging on wires of the cable raceway 11, which make it possible to secure the fastener 13 rigidly to said cable raceway, the fastener 13 comprises catches 39 and 40 to secure it to the curved elongated panel 12.

The catch 39 is configured to receive the rib 33. The catch 40 is configured to receive the rib 34.

The rib 33 has an angled profile and has a bead 41 at its distal end.

The rib 34 has a straight profile and has a bead 42 at its distal end.

The catches 39 and 40 are at the ends of the fastener 13.

To position the curved elongated panel 12 on the fastener 13, the bead 41 of the rib 33 is first forcibly inserted into the catch 39 and the curved elongated panel 12 is then pivoted around the bead 41 to insert the bead 42 of the rib 34 into the catch 40.

Here, the catch 39 and the catch system 35 are horizontally aligned, and the catch 40 and the catch system 36 are vertically aligned.

As already stated, the curved elongated panels 12 are identical and arranged head-to-tail, so that the arrangement of each curved elongated panel 12 is a mirror image of the other curved elongated panel 12.

The same applies to the fasteners 13 used to fasten one of the curved elongated panels 12 and the fasteners 13 used to fasten the other curved elongated panel 12.

The routing assembly 12 thus has, on each lateral side, an arrangement that is a mirror image of the arrangement on the other lateral side.

The main wall 30, and more generally the curved elongated panel 12, envelops the outside of the cable raceway 11 in line with the side wall 16 onto which the curved elongated panel 12 is fastened and in line with a portion of the base 15 starting from said side wall 16.

Here, the gap between the two curved elongated panels 12 is of the order of 80 mm and the width of the cable raceway 11 is of the order of 300 mm.

Each portion of the base 15 with which a curved elongated panel 12 is in line therefore has a width, from the side wall 16 to which said curved elongated panel 12 is fastened, of the order of 110 mm.

Here, the upper longitudinal side of the main wall 30 of the curved elongated panel 12, to which the return 31 is connected, is above the edge 19 of the cable raceway 11.

Thus, the curved elongated panel 12 is in line with the entire side wall 16 to which it is fastened.

Here, the curved elongated panel 12 is completely curved, i.e. the main wall 30 is completely curved from its upper longitudinal side, to which the return 31 is connected, to its lower longitudinal side, to which the return 32 is connected.

The main wall 30 therefore has a very different profile from the cable raceway portion with which it is in line (in the cable raceway 11, the side wall 16 and the base 15 are straight and arranged transverse to each other).

Due to said difference in profile and due to the arrangement of the catches 39 and 40 of the fasteners 13, there is a relatively large distance between the main wall 30 of the curved elongated panel 12 and the cable raceway 11.

It will in particular be observed that the portion of the curved elongated panel 12 cantilevered between the rib 34 and the return 32 is relatively far away from the base 15.

Figure 5:
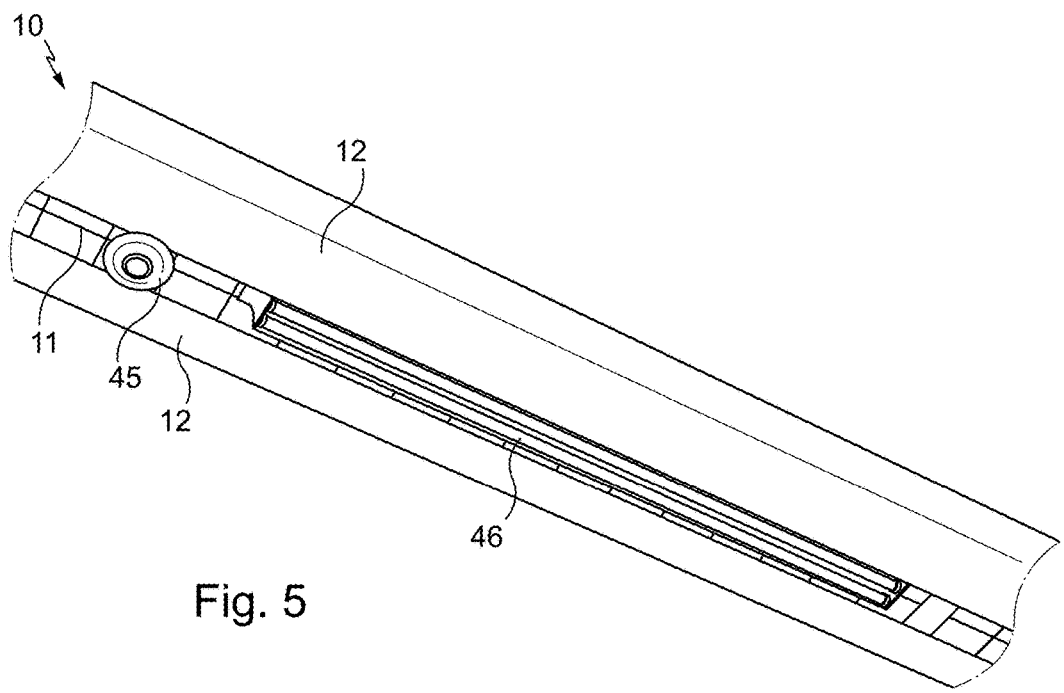
FIG. 5 is a partial perspective view, from below, showing electrical appliances fastened to the cable raceway between the curved elongated panels forming the cover of the routing assembly, the electrical appliances here being a smoke detector and a tubular light fitting.

The middle portion of the base 15 that is not enveloped by the cover formed by the two curved elongated panels 12 is available to act as a fastening support for electrical appliances, for example the smoke detector 45 and the tubular light fitting 46 shown in FIG. 5.

To fasten the smoke detector 45, the light fitting 46 or another electrical appliance, a mounting component as described in French patent application 2 716 768 is used, for example, to act as an interface between the cable raceway 11 and the electrical appliance to be fastened to said cable raceway.

The cable routing assembly 10 thus offers a visual appearance provided mainly by the cover formed by the two curved elongated panels 12, while retaining the possibility, like bare cable raceways, of acting as a support for electrical appliances or other accessories.

The cable routing assembly 10 is intended to remain visible, including in an office building, and not to be hidden behind a false ceiling.

It will be observed that the cantilevered portion of the curved elongated panels 12 located between the rib 34 and the return 32 can be used to house electrical cables or the like supplying the electrical appliances fastened to the cable raceway 11.

It will be noted that each fastener 13 comprises a clip 47 (FIG. 4) that can be used to house electrical or similar cables supplying the electrical appliances fastened to the cable raceway 11.

Each fastener 13 also has an opening 48 through which a clamp for fastening cables or similar can pass near the clip 47 and a similar opening 49 near the catch system 35 and the catch 39.

As already stated, each curved elongated panel 12 extends between two brackets 20 or similar support members, or between two direction-change accessories.

The elongated panels 12 are for example supplied in different predetermined lengths such as 400 mm, 900 mm, 1,400 mm and 1,900 mm.

Figure 6:
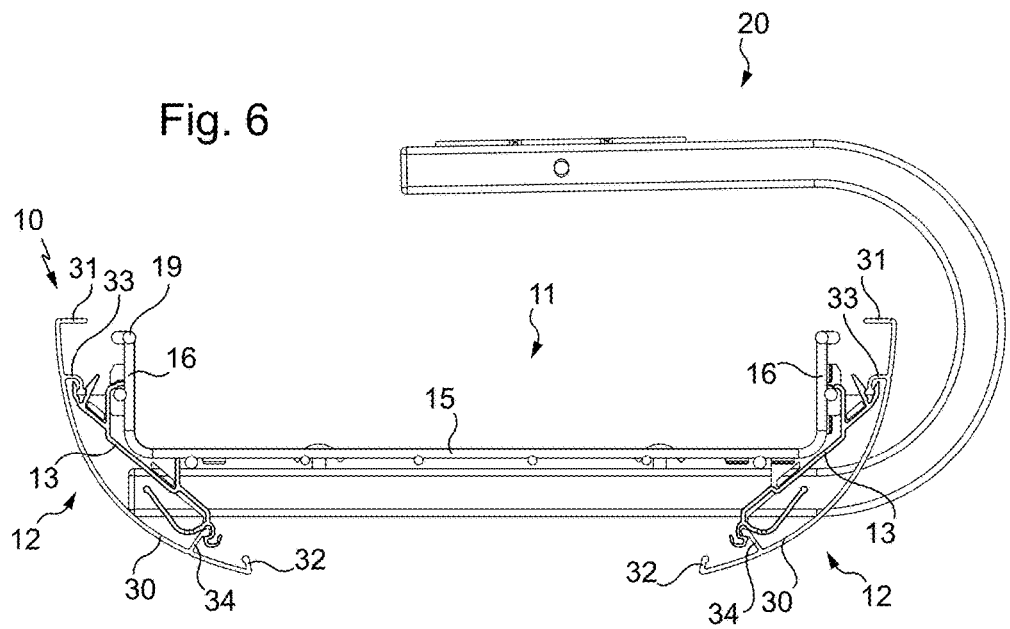
FIG. 6 is a similar view to FIG. 2, but for a variant of the routing assembly in which the curved elongated panels of the cover have one portion facing the base of the cable raceway that is shorter.
Figure 8:
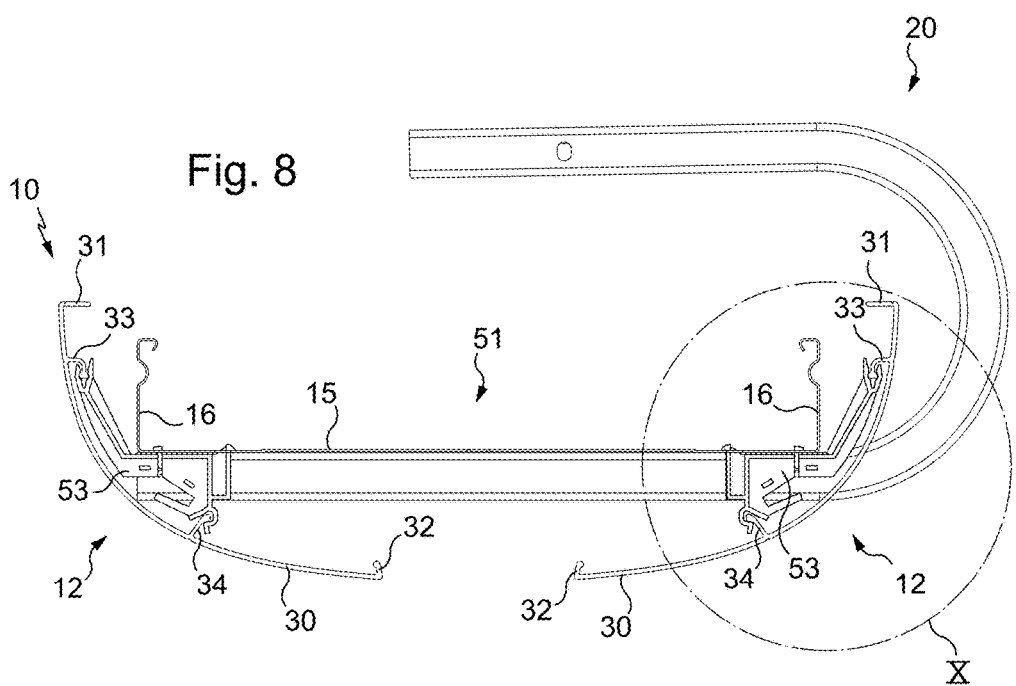

In the variant of the routing assembly 10 shown in FIG. 6, the curved elongated panels 12 are identical apart from the fact that they envelop the base 15 of the cable raceway 11 over a smaller portion starting from the side wall 16 (the cantilevered portion between the rib 34 and the return 32 is shorter).

Here, the gap between the two curved elongated panels 12 is of the order of 190 mm.

Thus, each portion of the base 15 with which a curved elongated panel 12 is in line has a width, from the side wall 16 to which said curved elongated panel 12 is fastened, of the order of 55 mm.

In the variant of the cable routing assembly 10 shown in FIGS. 7 to 10, the metal wire mesh cable raceway 11 is replaced by a perforated sheet metal cable raceway 51, and the fasteners 13 configured to engage with a metal wire mesh are replaced by fasteners 53 configured to engage with a perforated metal sheet.

Like the metal wire mesh cable raceway 11, the perforated sheet metal cable raceway 51 is a conventional U-shaped cable raceway the walls of which, in this case a base 15 and two side walls 16, are openworked.

The holes in the base 15 and the side walls 16 are formed by openings 52.

Here, the openings 52 are elongated openings oriented in the longitudinal direction, with a row of aligned openings 52 made in each side wall and a plurality of rows of aligned openings 52 made in the base 15.

Here, in the base 15, the row of openings 52 closest to each of the side walls 16 and the adjacent row of openings 52 are longitudinally offset so that, on each side of the base 15, the openings 52 in the row closest to the side wall 16 and the openings 52 in the adjacent row are staggered.

Like on the cable raceway 11, on the cable raceway 51, each side wall 16 ends in the opposite direction to the base 15 in an edge 19, here formed by a return in the metal sheet.

Like the fasteners 13, the fasteners 53 are made from a material that is rigid but has a certain degree of elasticity, here a moulded plastic.

Figure 9:
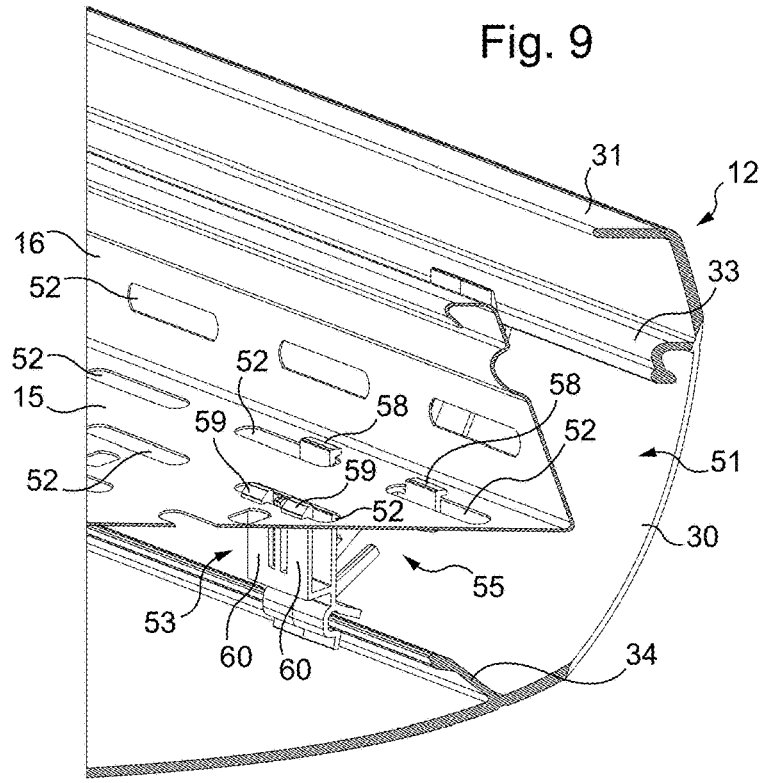
Figure 10:
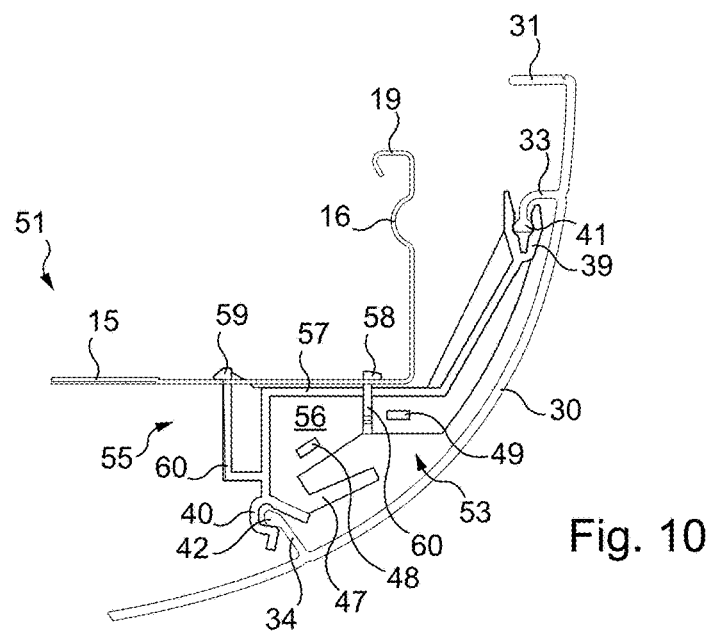

The fastener 53 will now be described in more detail, with reference to FIGS. 9 and 10.

The fastener 53 is configured, like the fastener 13, to engage on the one hand on the cable raceway, here the perforated sheet metal cable raceway 51, and on the other hand on the ribs 33 and 34 of the curved elongated panel 12.

To secure the fastener 53 to the curved elongated panel 12, the fastener 53 comprises catches 39 and 40 like the catches 39 and 40 of the fastener 13.

To secure the fastener 53 to the cable raceway 51, the fastener 53 comprises a catch system 55 to engage on a wall of the cable raceway 51, here on the base 15.

More specifically, the catch system 55 comprises a member 57 for bearing on the base 15 and retaining detents 58 and 59 for holding onto the periphery of certain openings 52 in the base 15.

Each retaining detent 58 and 59 starts from the distal end of a flexible lug 60 and extends in the transverse direction. The retaining detents 58 extend in the opposite direction to that of the retaining detents 59.

Here, there are two retaining detents 58, each intended to pass respectively through an opening 52 in the row closest to a side wall 16 and through an adjacent opening 52 in the same row; there are also two detents 59, both intended to pass through the same opening 52 in the adjacent row.

Here, the retaining detents 58 extend towards the closest side wall 16 and the retaining detents 59 extend in the opposite direction to said side wall 16.

The flexible lugs 60 holding the retaining detents 58 and the flexible lugs 60 holding the retaining detents 59 are configured to bend elastically towards each other to enable the detents 58 and 59 to enter the aforementioned openings 52 and then to spring back when the detents 58 and 59 have passed through said openings and the bearing member 57 is against the base 15.

The catch system 55 then rigidly fastens the fastener 53 to the cable raceway 51.

Here, the fastener 53 is configured so that the retaining detents 58 and 59 are arranged on the inside of the base 15 and so that the support member 57 is arranged on the outside of the base 15.

With this arrangement, only the retaining detents 58 and 59, which have small dimensions, protrude on the inside of the cable raceway 51.

The bearing member 57 is formed by a wall of a stage 56. The flexible lugs 60 holding the retaining detents 58 are arranged laterally on either side of the stage 56. The flexible lugs 60 holding the retaining detents 59 are arranged side-by-side at the end of the stage 56.

The fastener 53, like the fastener 13, comprises a clip 47 to house electrical cables or the like, and openings 48 or 49 through which a clamp for fastening cables or the like can pass.

The fastener 53 is positioned by moving it in a vertical direction towards the area of the base 15 where the aforementioned openings 52 are located, with the retaining detents 58 and 59 facing the base 15, and then passing the retaining detents 58 and 59 through said openings 52. As stated above, when the retaining detents 58 and 59 have passed through the openings 52, the fastener 53 is then rigidly fastened to the cable raceway 51.

The curved elongated panel 12 is positioned on the fasteners 53 in the same way as on the fasteners 13.

Generally, the dimensions of the cable raceway 51 are similar to the dimensions of the cable raceway 11, and the fasteners 53 position the curved elongated panels 12 in relation to the cable raceway 51 in the same way as the fasteners 13 position the curved elongated panels 12 in relation to the cable raceway 11.

In a variant (not shown) of the routing assembly 10 comprising the cable raceway 51, the curved elongated panels 12 are replaced by curved elongated panels 12 that are identical to those shown in FIG. 6, i.e. they envelop the base 15 of the cable raceway 51 over a smaller portion starting from the side wall 16 (the cantilevered portion between the rib 34 and the return 32 is shorter).

Figure 11:
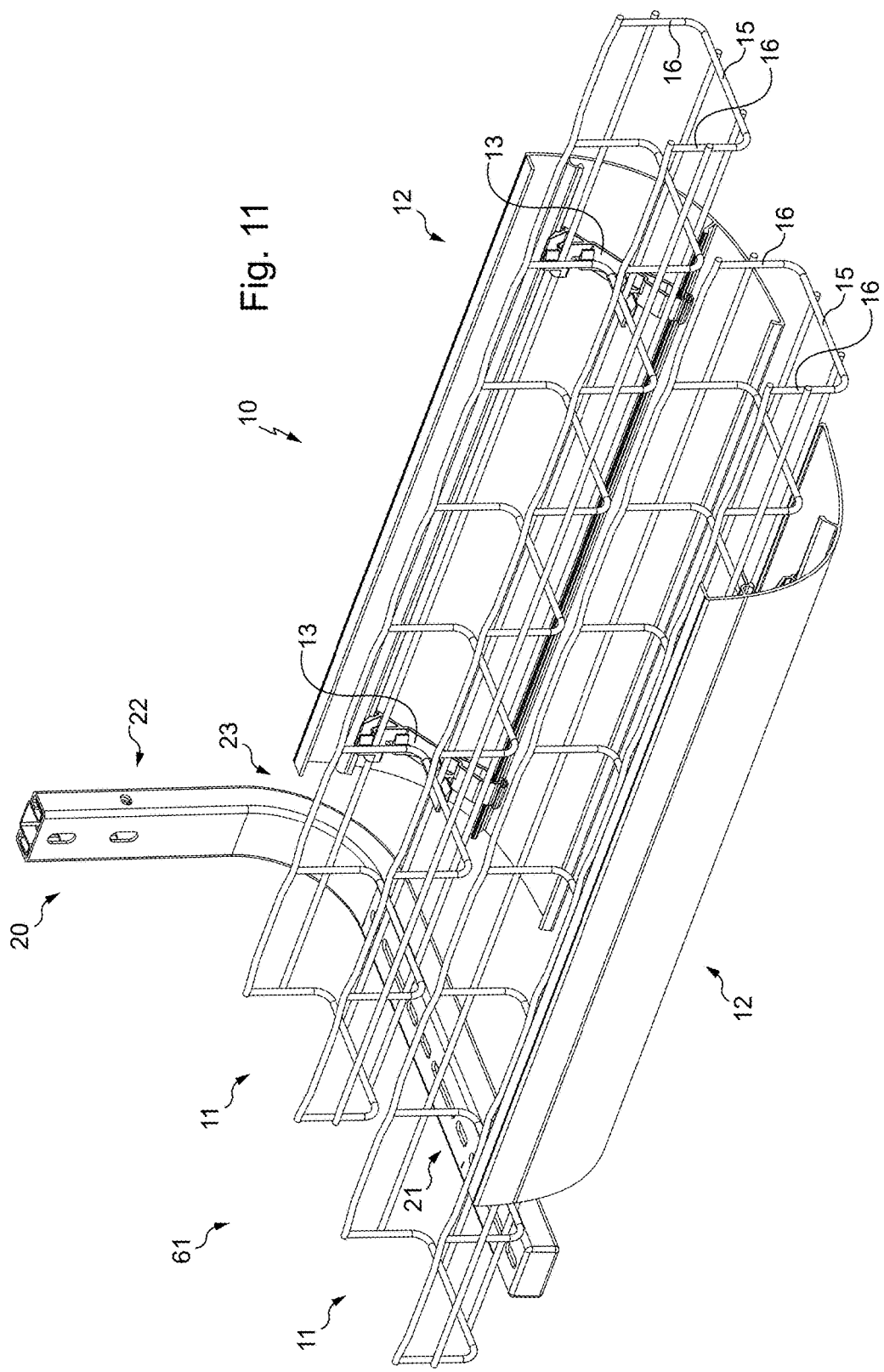
FIGS. 11 to 13 are similar views to FIGS. 1, 2 and 6, but for a routing assembly comprising two cable raceways side-by-side.
Figure 12:
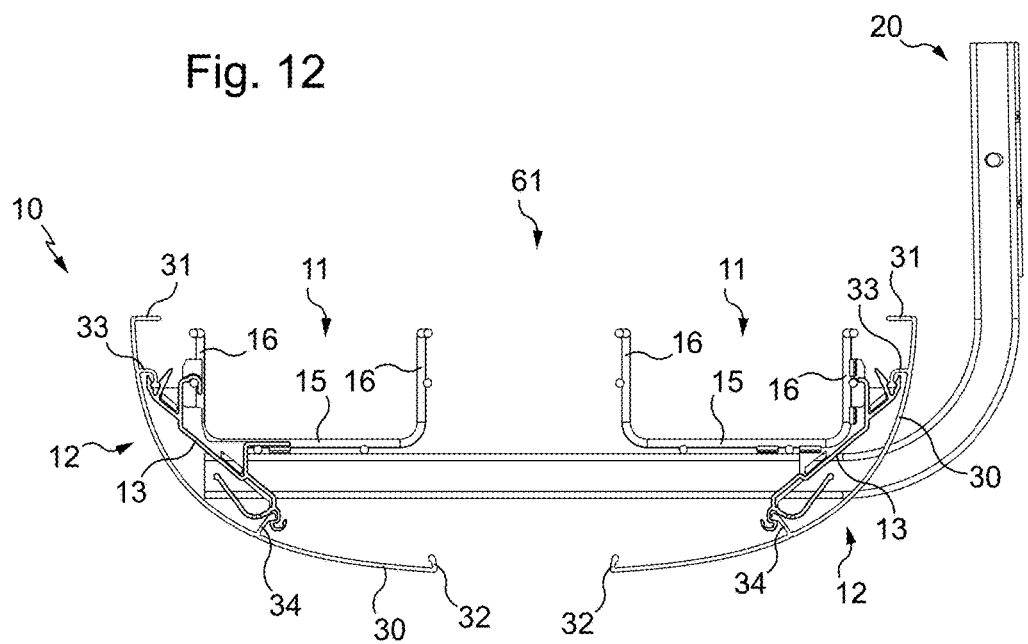

In the variant shown in FIGS. 11 and 12, the routing assembly 10 is similar to the routing assembly 10 shown in FIGS. 1 to 5, apart from the fact that the cable raceway 11 is replaced by a cable routing device 61 formed by two cable raceways 11 arranged side-by-side, each similar to the cable raceway 11 in the routing assembly 10 shown in FIGS. 1 to 5, apart from the fact that it is narrower.

Whereas the cable raceway 11 in the routing assembly 10 shown in FIGS. 1 to 5 has a width of the order of 300 mm, in the routing device 61, each of the cable raceways 11 has a width of the order of 100 mm.

Furthermore, the bracket 20 configured to be fastened to a structure such as a ceiling is replaced by a bracket 20 configured to be fastened to a structure such as a wall.

The elbow 23 is curved along an arc over approximately 90° (and not) 180°) so that the portion 22 is oriented transverse (and not parallel) to the portion 21.

The portion 22 is relatively short, so that the portion 21 can be relatively close to the ceiling.

In the routing device 61, for each cable raceway 11, no curved elongated panel 12 is fastened on the inner side, i.e. on the side of the other cable raceway, and a curved elongated panel 12 is only fastened on the outer side.

Given the dimensions stated above, and as can be seen in FIG. 12, for each cable raceway 11 of the routing device 61, the curved elongated panel 12 is in line with the entire base 15.

The two cable raceways 11 are spaced apart from each other, so that there is a similar gap between the two curved elongated panels 12 to the gap that exists between the curved elongated panels 12 of the routing assembly 10 shown in FIGS. 1 to 5.

The two cable raceways 11 are for example installed on the brackets 20 or the like with a spacer gauge and/or positioning markers marked on the brackets 20 or the like are used.

Generally, in the routing assembly 10 shown in FIGS. 11 and 12, the cover formed by the two curved elongated panels 12 is arranged in relation to the routing device 61 in the same way as in relation to the cable raceway 11 of the routing assembly 10 shown in FIGS. 1 to 5: the cover formed by the two curved elongated panels 12 envelops the outside of each lateral side of the routing device 61, formed by the outer side wall 16 of each of the cable raceways 11 respectively, and partially envelops the outside of the bottom side of the routing device 61, formed by the base 15 of both of the cable raceways 11 and by the gap existing between said bases 15.

It will be observed that the single cable raceway 11 in the routing assembly 10 shown in FIGS. 1 to 5 or in FIG. 6, like the single cable raceway 51 in the routing assembly 10 shown in FIGS. 7 to 10, constitutes a cable routing device each lateral side of which is respectively formed by one of the side walls 16 and the bottom of which is formed by the base 15.

Figure 13:
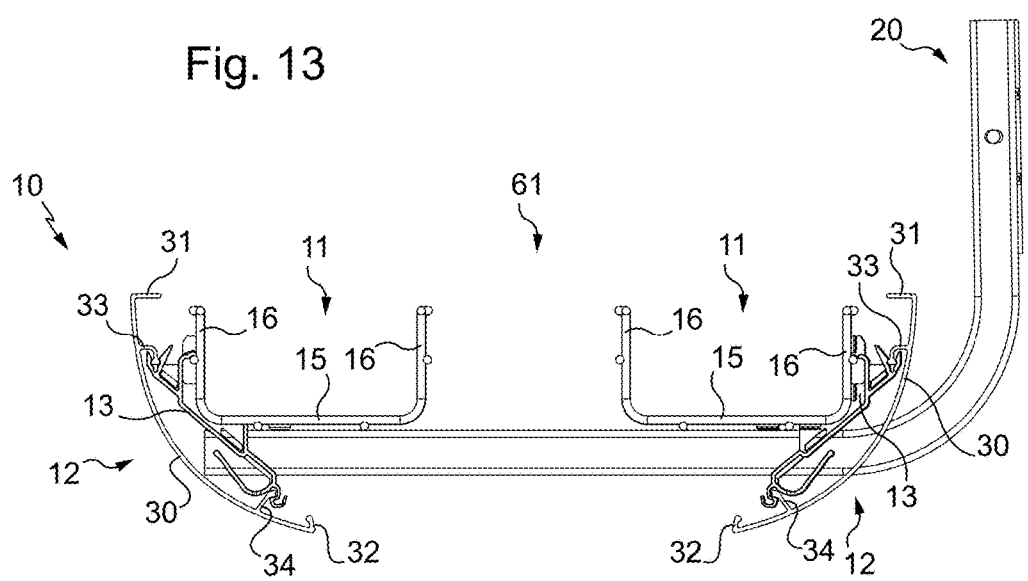

In the variant of the routing assembly 10 comprising the routing device 61 shown in FIG. 13, the curved elongated panels 12 are identical to those shown in FIG. 6, i.e. with the shorter cantilevered portion between the rib 34 and the return 32.

The curved elongated panels 12 therefore envelop the bottom side of the routing device 61 over a smaller portion starting from the lateral sides, and for each cable raceway 11, the base 15 is enveloped by a curved elongated panel 12 over only a portion starting from the outer side wall 16.

In the variant shown in FIGS. 14 and 15, the routing assembly 10 is similar to the routing assembly 10 shown in FIGS. 11 to 12, apart from the fact that the cable routing device 61 formed by two metal wire mesh cable raceways 11 is replaced by a cable routing device 62 formed by two perforated sheet metal cable raceways 51, each like the cable raceway 51 in the routing assembly 10 shown in FIGS. 7 to 10, apart from the fact that it is narrower.

Whereas the cable raceway 51 in the routing assembly 10 shown in FIGS. 7 to 10 has a width of the order of 300 mm, in the routing device 62, each of the two cable raceways 51 has a width of the order of 100 mm.

Generally, the dimensions of the routing device 62 are similar to the dimensions of the routing device 61, and the fasteners 53 position the curved elongated panels 12 in relation to the routing device 62 in the same way as the fasteners 13 position the curved elongated panels 12 in relation to the routing device 61.

The middle portion of the bottom side of the routing device 61 (FIGS. 11 and 12) or the routing device 62 (FIGS. 14 and 15), which is not enveloped by the cover formed by the two curved elongated panels 12, is available for mounting electrical appliances such as the smoke detector 45 and the tubular light fitting 46 shown in FIG. 5.

Figure 17:
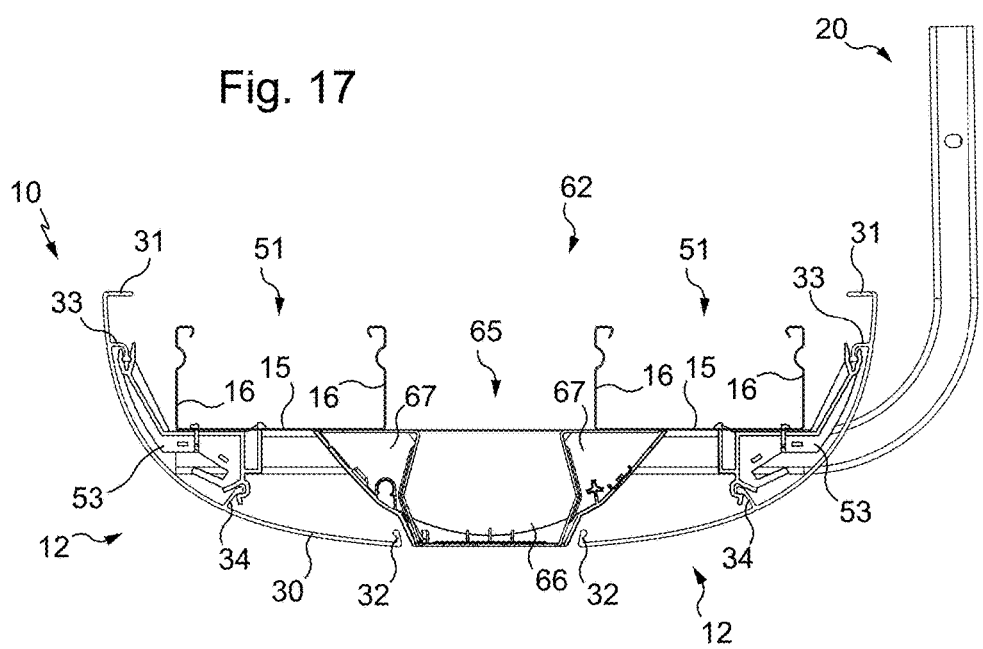
FIG. 17 is a similar view to FIG. 15, but with a component for mounting an electrical appliance fastened in line with both of the two cable raceways and arranged between the two curved elongated panels.
Figure 18:
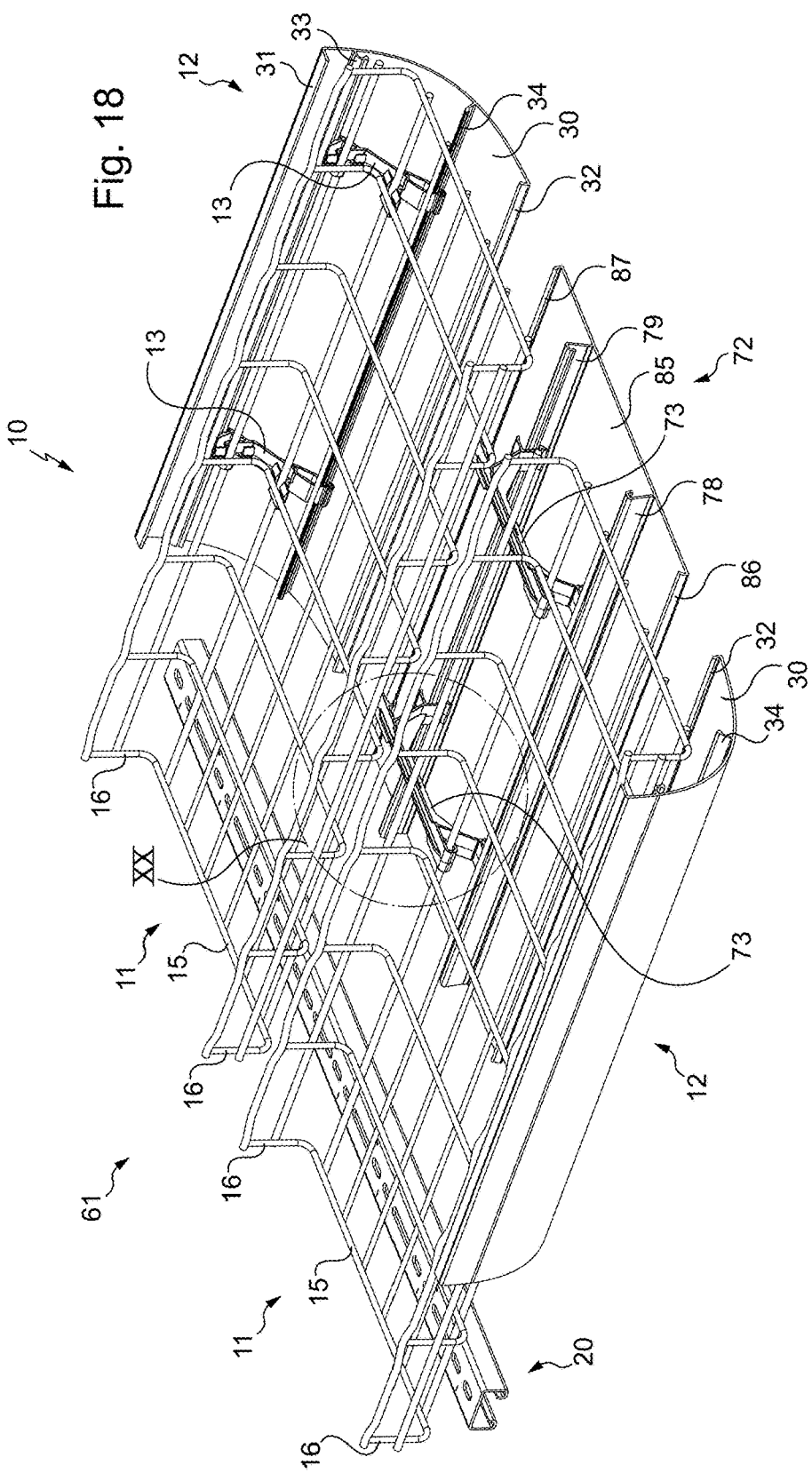
FIGS. 18 and 19 are similar views to FIGS. 11 and 12, but for two wider cable raceways and a cover that also includes a straight elongated panel located between the two curved elongated panels.
Figure 19:
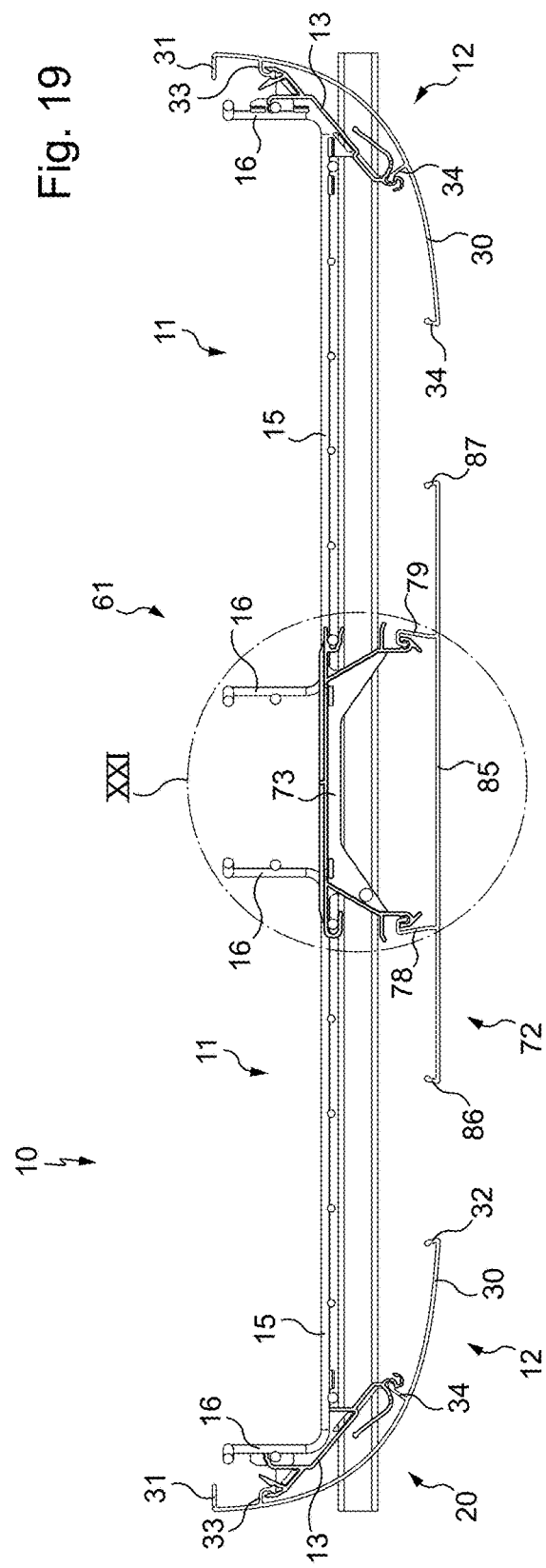

To fasten said electrical appliances, the mounting component 65 shown in FIG. 17 is used for example, to act as an interface between the routing device 61 or the routing device 62 and the electrical appliance to be fastened.

The following description of the mounting component 65 is given for the routing device 62 with reference to FIG. 17, but it is understood that said description also applies to the routing device 61, replacing the references to the cable raceways 51 by references to the cable raceways 11.

The mounting component 65 is configured to engage on both of the two cable raceways 51, here on the bases 15 thereof.

The mounting component 65 comprises a central body 66 and two rims 67 arranged on either side of the central body 66, each configured to be fastened to the base 15 of one of the cable raceways 51 respectively using fastening elements (not shown), for example like the fastening elements on the fastener 83 shown in FIGS. 22 to 24 (fastener 73 shown in FIGS. 18 to 21 if the cable raceways 51 are replaced by cable raceways 11).

The central body 66 is configured to act as a fastening support for the electrical appliance to be mounted.

Here, the central body 66 and the rims 67 are each configured as a box section; each rim 67 has an upper wall forming a member for bearing on the base 15 of one of the cable raceways 51, and the central body 66 comprises a lower wall flush with the curved elongated panels 12.

In the variant shown in FIG. 16, the routing assembly 10 is similar to the routing assembly 10 shown in FIGS. 14 and 15, apart from the fact that the curved elongated panels 12 are replaced by curved elongated panels 12 identical to those shown in FIG. 6.

The cover formed by said curved elongated panels 12 is therefore positioned in relation to the routing device 62 in the same way as the cover in FIG. 13 is positioned in relation to the routing device 61.

To fasten electrical appliances to the routing assembly 10 shown in FIG. 13 or the routing assembly 10 shown in FIG. 16, the mounting component 65 can be used, engaging on the two cable raceways 11 (FIG. 13) or 51 (FIG. 16), or the electrical appliance can be fastened to just one of the cable raceways.

In the variant shown in FIGS. 18 to 21, the routing assembly 10 is similar to the routing assembly 10 shown in FIGS. 11 to 12, apart from the fact that:

in the cable routing device 61, the two cable raceways 11 are identical to the cable raceway 11 of the routing assembly 10 shown in FIGS. 1 to 5, i.e. with a width of the order of 300 mm (and not of the order of 100 mm as in the routing device 61 of the routing assembly 10 shown in FIGS. 11 and 12); and the cover of the routing device 61 comprises, in addition to the two curved elongated panels 12, a straight elongated panel 72 arranged between the two curved elongated panels 12.

Furthermore, the bracket 20 configured to be fastened to a structure such as a wall, is replaced by a straight rail 20 configured to be connected to a structure such as a ceiling using well-known suspension members such as wire rope or metal rods.

The two cable raceways 11 of the routing device 61 shown in FIGS. 18 to 21 are separated from each other by the same gap as the cable raceways 11 of the routing device 61 shown in FIGS. 11 and 12.

The straight elongated panel 72 and the cable raceways 11 are fastened together by means of a fastener 73 that will be described in detail below.

When the straight elongated panel 72 is in place, it is aligned with the curved elongated panels 12, and more specifically with the lower longitudinal side of each main wall 30.

The straight elongated panel 72 is arranged centred between the two curved elongated panels 12, so that there is the same gap on each side of the straight elongated panel 72 between it and the corresponding curved elongated panel 12.

Here, the straight elongated panel 72 has a width of the order of 320 mm and the gap between the straight elongated panel 72 and each curved elongated panel 12 is of the order of 80 mm.

Thus, in the routing assembly 10 shown in FIGS. 18 to 21, the gap between each curved elongated panel 12 and the straight elongated panel 72 is similar to the gap between the two curved elongated panels 12 of each of the routing assemblies 10 shown respectively in FIGS. 1 to 5, FIGS. 8 to 10, FIGS. 11 and 12 and FIGS. 14 and 15.

In the routing assembly 10 shown in FIGS. 18 to 21, the cover formed by the two curved elongated panels 12 and by the straight elongated panel 72 envelops the outside of each lateral side of the routing device 61, formed by the outer side wall 16 of each of the cable raceways 11, and partially envelops the outside of the bottom side of the routing device 61, formed by the base 15 of both of the cable raceways 11 and by the gap existing between said bases 15.

The straight elongated panel 72 envelops said routing device 61 in line with the area spanning the two cable raceways 11 and over a portion of the base 15 of each of the two cable raceways 11 starting from the inner side wall 16.

Generally, the cover formed by the two curved elongated panels 12 and the straight elongated panel 72 envelops the outside of the routing device 61 shown in FIGS. 18 to 21 on the bottom side apart from solely in line with the middle portion of the base 15 of each cable raceway 11.

Like the fastener 13 and the fastener 53, the fastener 73 is made from a material that is rigid but has a certain degree of elasticity, here a moulded plastic.

Figure 20:
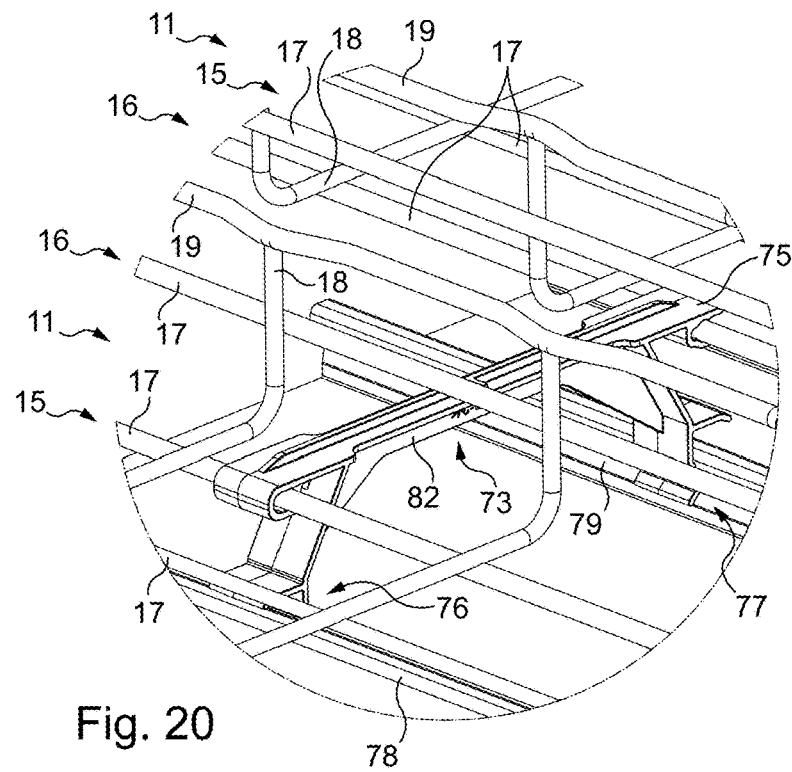
FIGS. 20 and 21 are detailed views marked respectively as XX in FIG. 18 and XXI in FIG. 19.
Figure 21:
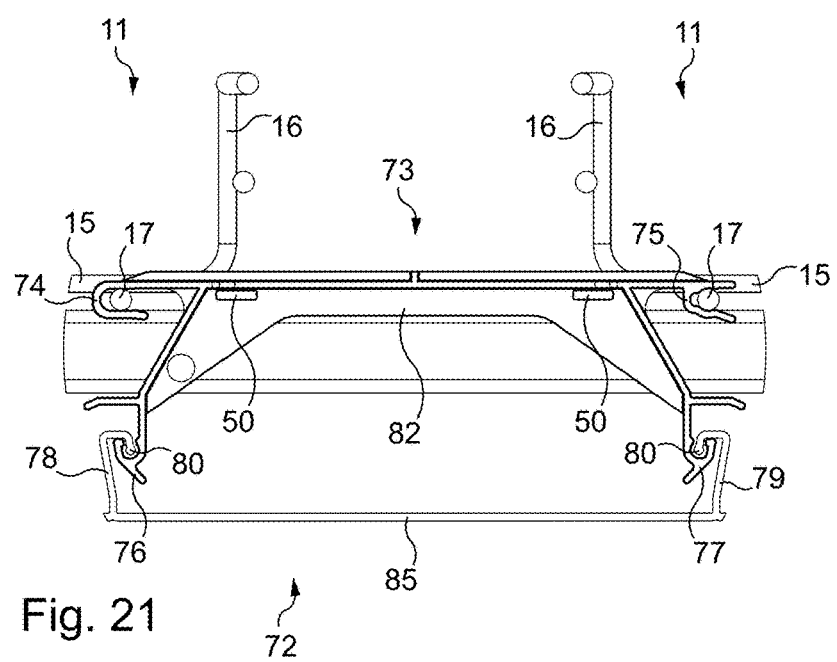

The fastener 73 will now be described in more detail, with reference to FIGS. 20 and 21.

The fastener 73 comprises four catches 74, 75, 76 and 77, held by a U-shaped body 82.

The catches 74 and 75 are horizontally aligned. They are used to secure the fastener 73 to the cable raceways 11.

The hooks 76 and 77 are horizontally aligned. They are used to secure the fastener 73 to the straight elongated panel 72.

The catch 74 is configured to receive a warp wire 17 of the base 15 of one of the cable raceways 11, in this case the warp wire 17 closest to the inner side wall 16 of said cable raceway 11.

The catch 75 is configured to receive the corresponding warp wire 17 of the other cable raceway 11.

It will be observed that the catches 74 and 75 are open on the same side (to the right in FIG. 21) so that the fastener 73 can be placed on the cable raceways 11 by positioning the open side of the hooks 74 and 75 in front of the warp wire 17 that they are to receive and then moving the fastener 73 transversely to push said warp wires 17 into the catches 74 and 75.

The straight elongated panel 72 comprises a main wall 85. On the side intended to face the cable raceways, the straight elongated panel 72 comprises:
- a return 86 and a return 87, each connected by a longitudinal side to a respective longitudinal side of the main wall 85; and
- a rib 78 and a rib 79 each extending longitudinally, with the rib 78 being located between the return 86 and the rib 79 and the rib 79 being located between the rib 78 and the return 87.

Each rib 78 and 79 has an angled profile and has a bead 80 at its distal end.

The ribs 78 and 79 are configured as mirror images of each other, with the bead 80 of the rib 78 facing the bead 80 of the rib 79, To position the straight elongated panel 72 on the fastener 73, the bead 80 of the rib 78 is forcibly pushed into the catch 76 and the bead 80 of the rib 79 into the catch 77.

It will be noted that if the straight elongated panel 72 is placed head-to-tail, the catch 76 can receive the rib 79 while the catch 77 can receive the rib 78.

Each space located between a curved elongated panel 12 and the straight elongated panel 72 is used in the same way as the space located between the two elongated panels 12 in the routing assembly 10 shown in FIGS. 1 to 5.

It will be observed that each cantilevered portion of the straight elongated panel 72 located respectively between the rib 78 and the return 86 and between the rib 79 and the return 87 can be used to house electrical cables supplying the electrical appliances fastened to the cable raceways 11.

It will be noted that the fastener 73 has openings 50 through which a clamp for fastening electrical or similar cables can pass.

In a variant (not shown) of the routing assembly 10 in FIGS. 18 to 21, the curved elongated panels 12 are replaced by curved elongated panels 12 identical to those shown in FIG. 6 (shorter cantilevered portion between the rib 34 and the return 32) and similarly, the straight elongated panel 72 is replaced by a narrower elongated panel.

In the variant shown in FIGS. 22 to 24, the routing assembly 10 is similar to the routing assembly 10 shown in FIGS. 14 and 15, apart from the fact that:
- in the cable routing device 62, the two cable raceways 51 are identical to the cable raceway 51 of the routing assembly 10 shown in FIGS. 7 to 10, i.e. with a width of the order of 300 mm (and not of the order of 100 mm as in the routing device 61 of the routing assembly 10 shown in FIGS. 14 and 15); and
- the cover of the routing device 62 comprises, like the routing assembly 10 shown in FIGS. 18 to 21, a straight elongated panel 72 arranged between the two curved elongated panels 12.

The straight elongated panel 72 is fastened to the two perforated sheet metal cable raceways 51 by a fastener 83 similar to the fastener 73, apart from the fact that the catches 74 and 75 are replaced by receiving holes and by fastening elements having flexible tabs 90 and 91, configured so that they do not pass through the openings 52 and having rods to enter the holes 52 and lock in the receiving holes.

Generally, the dimensions of the routing device 62 shown in FIGS. 22 to 24 are similar to the dimensions of the routing device 61 shown in FIGS. 18 to 21, the fasteners 53 position the curved elongated panels 12 in relation to the routing device 62 in the same way as the fasteners 13 position the curved elongated panels 12 in relation to the routing device 61, and the fasteners 83 position the straight elongated panel 72 in relation to the routing device 62 in the same way as the fasteners 73 position the straight elongated panel 72 in relation to the routing device 61.

In a variant (not shown) of the routing assembly 10 in FIGS. 22 to 24, the curved elongated panels 12 are replaced by curved elongated panels 12 identical to those shown in FIG. 6 (shorter cantilevered portion between the rib 34 and the return 32) and similarly, the straight elongated panel 72 is replaced by a narrower elongated panel.

In variants (not shown):
the elongated panel 12 is replaced by a curved elongated panel configured differently and/or fastened differently to the cable raceway, but still with the upper longitudinal side (side such as the upper longitudinal side of the main wall 30) distanced from the edge 19 of the cable raceway;
the elongated panel 12 is replaced by a curved elongated panel configured differently and/or fastened differently to the cable raceway, but still with a cantilevered portion distanced from the base 15 of the cable raceway;
the elongated panel 12 is replaced by an elongated panel that is not completely curved between its upper longitudinal side and its lower longitudinal side, for example with a main wall that comprises a flat portion or several flat portions and/or an elbow or several elbows;
the straight elongated panel 72 is replaced by an elongated panel the main wall of which is generally straight, but without being strictly flat, for example with undulations;
the routing assembly comprises a single cable raceway with a single curved elongated panel 12, for example with one of the side walls of the cable raceway facing a wall and the curved elongated panel 12 facing the other side wall 16;
the routing assembly comprises a routing device formed by a metal wire mesh cable raceway and a perforated sheet metal cable raceway arranged side-by-side;
the routing assembly comprises more than two cable raceways arranged side-by-side, for example three cable raceways with a straight elongated panel such as the elongated panel 72 enveloping the bottom side of the cable routing device in line with each area spanning two cable raceways;
the routing assembly is secured to a structure such as a wall or a ceiling by members other than the brackets 20 or the rail 20, for example by threaded rods, fastened to the structure such as a ceiling, engaging in fastening elements installed on the cable raceways;
the electrical appliances fastened to the routing assembly are different from a smoke detector or a tubular light fitting, for example spot light fittings;
the fasteners 13 are configured differently, for example with the catch system 35 and the catch system 36 being combined and/or the catches 39 and 40 being replaced by other fastening elements such as clips;
the fasteners 53 are different, for example with the retaining detents arranged with a single wider detent instead of the two retaining detents 59 and/or the catches 39 and 40 being replaced by other fastening elements such as clips;
the curved elongated panel 12 is fastened to the fasteners such as 13 and 53 differently, for example the ribs 33 and 34 are replaced by grooves and the fasteners such as 13 and 53 comprise elements for fastening to said grooves;
the fasteners 73 are different, for example the catches 74 and 75 are each replaced by catch systems such as the systems 35 and 36 of the fastener 13 and/or the catches 76 and 77 are replaced by other fastening elements such as clips;
the fasteners 83 are different, for example the members comprising the flexible tabs 90 and 91 are each replaced by retaining detents such as the retaining detents 58 and 59 of the fastener 53, made in one piece with the rest of the fastener 83; and/or
the curved elongated panel 72 is fastened to the fasteners such as 73 and 83 differently, for example the ribs 78 and 79 are replaced by grooves and the fasteners such as 73 and 83 comprise elements for fastening to said grooves.

Many other variants are possible depending on the circumstances, and it must be pointed out in this regard that the invention is not limited to the examples described and shown.

The invention claimed is:

1. A cable routing assembly, comprising:
an openworked cable raceway having a base and side walls; and
at least one curved elongated panel, the concave surface of which faces towards the cable raceway, the curved elongated panel being fastened to said cable raceway and enveloping the outside of said cable raceway in line with a single side wall and in line with at least a portion of the base starting from said side wall, the curved elongated panel being at a first distance from an edge of the cable raceway, the elongated panel having a cantilever portion at a second distance from the base of the cable raceway,
wherein the cable routing assembly is configured to be installed along a ceiling, and
the cantilever portion envelops the at least one portion of the base at the second distance from the base of the cable raceway.

2. The cable routing assembly according to claim 1, wherein said curved elongated panel comprises a main wall and longitudinally-oriented ribs, protruding from said main wall on the concave side of said curved elongated panel, and the cable routing assembly further comprises fasteners configured to fasten said cable raceway and said curved elongated panel to one another, each of the fasteners comprising elements configured to fasten onto said ribs.

3. The cable routing assembly according to claim 2, wherein said cable raceway is made from metal wire mesh and said fastener comprises at least one system of catches configured to engage on wires of said cable raceway.

4. The cable routing assembly according to claim 2, wherein said cable raceway is made from perforated sheet metal and said fastener comprises detents configured to hold onto the periphery of openings of the cable raceway.

5. The cable routing assembly according to claim 1, wherein said curved elongated panel is completely curved between its upper longitudinal side and its lower longitudinal side.

6. The cable routing assembly according to claim 1, further comprising:
a routing device formed by said cable raceway or formed by said cable raceway and at least one other cable raceway with the cable raceways of the routing device arranged side-by-side, each cable raceway included in said routing device being openworked and having a base and side walls; and a cover formed by at least said curved elongated panel and another curved elongated panel, said cover enveloping the outside of said routing device on each lateral side and partially on the bottom side starting from each lateral side.

7. The cable routing assembly according to claim 6, wherein said routing device is formed by said cable raceway and at least one other cable raceway, and said cover is formed by said curved elongated panel, said other curved elongated panel, and at least one straight elongated panel enveloping said routing device on the bottom side at least in line with an area spanning said two cable raceways.

8. The cable routing assembly according to claim 6, wherein said cover envelops the outside of the bottom side of said routing device apart from in line with the middle portion of the base of each said cable raceway.

9. The cable routing assembly according to claim 7, wherein said straight elongated panel comprises a main wall and longitudinally-oriented ribs protruding from said main wall, and said cable routing assembly further comprises fasteners configured to fasten said cable raceways of said routing device to said straight elongated panel, each of said fasteners comprising elements configured to fasten onto said ribs.

10. The cable routing assembly according to claim 6, wherein said routing device is formed by said cable raceway and at least one other cable raceway, and said cable routing assembly further comprises a mounting component configured to mount at least one electrical appliance between said cable raceway and said other cable raceway, the mounting component being configured to engage on said cable raceway and said other cable raceway.

11. The cable routing assembly according to claim 2, wherein said curved elongated panel is completely curved between its upper longitudinal side and its lower longitudinal side.

12. The cable routing assembly according to claim 2, further comprising:

a routing device formed by said cable raceway or formed by said cable raceway and at least one other cable raceway with the cable raceways of the routing device arranged side-by-side, each cable raceway included in said routing device being openworked and having a base and side walls; and a cover formed by at least said curved elongated panel and another curved elongated panel, said cover enveloping the outside of said routing device on each lateral side and partially on the bottom side starting from each lateral side.

13. The cable routing assembly according to claim 7, wherein said cover envelops the outside of the bottom side of said routing device apart from in line with the middle portion of the base of each said cable raceway.

14. The cable routing assembly according to claim 1, wherein the curved elongated panel completely envelops an elongated panel-facing side wall of the cable raceway.

* * * * *